Oct. 10, 1933.    A. L. R. ELLIS ET AL    1,930,340
COMPOSITE SILICA ARTICLE AND METHOD OF FABRICATING SAME
Filed May 10, 1932

Inventors:
Alvarado L. R. Ellis,
Gunnar A. F. Winckler,
by Charles E. Tullar
Their Attorney.

Patented Oct. 10, 1933

1,930,340

UNITED STATES PATENT OFFICE 1,930,340

COMPOSITE SILICA ARTICLE AND METHOD OF FABRICATING SAME

Alvarado L. R. Ellis, Swampscott, and Gunnar A. F. Winckler, Worcester, Mass., assignors to General Electric Company, a corporation of New York Application May 10, 1932. Serial No. 610,382

3 Claims. (Cl. 49—78.1)

The present invention relates to the fabrication of massive articles, such, for example, as large telescopic mirrors, from a material such as silica which, because of its refractory nature, can not be cast in a fused state by ordinary methods used in fabricating glass articles. It is the object of our invention to overcome this difficulty as will be explained.

In accordance with one method of fabricating silica bodies of extensive surface, a base of sintered silica first is formed by heating a mass of sand, or comminuted silica by radiant heat in an electric resistance furnace. Such a base shows a granular structure when a section is examined by transmitted light. A layer of fused, structureless silica is deposited thereon by projecting particles of silica through a flame on this base and causing them to unite by fusion. A process for carrying out this process is described in United States Letters Patent 1,869,163, Niedergesass, patented July 26, 1932, and also in United States application Serial No. 453,362, Ellis & Winckler, filed May 17, 1930 (see corresponding French Patent 718,857), both applications being assigned to the same assignee as that of the present application.

The process of building up masses of silica by the progressive fusion and incorporation of separate particles will be referred to herein briefly as an accretion process.

In accordance with our present invention, the entire article is fabricated by an accretion process, the building up of the article by accretion occurring at a higher rate for the main body (the base) than for the facing. The terms "base" and "facing" are used to distinguish different layers for convenience, although a completed article embodying our invention is unitary, that is without cleavage planes between the base and facing.

Our invention includes the new article of silica made by such accretion process.

Figure 1:
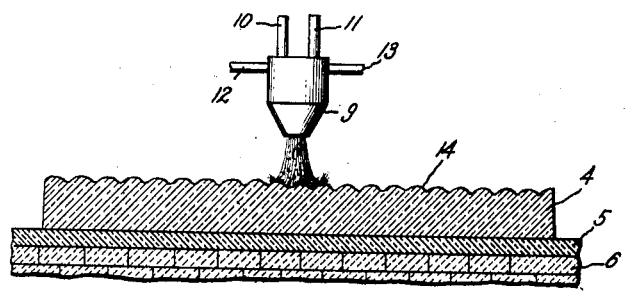
Figure 2:
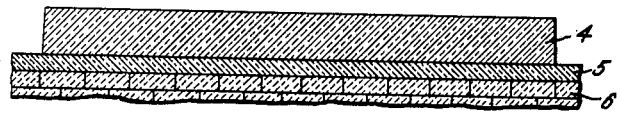
Figure 3:
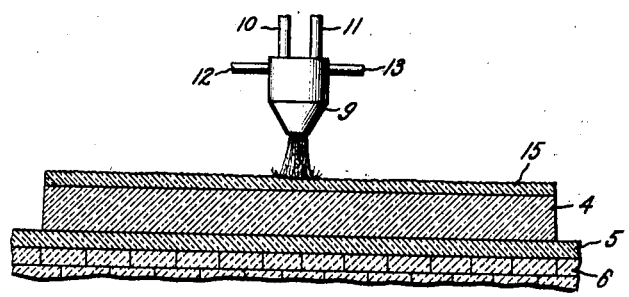
Figure 4:
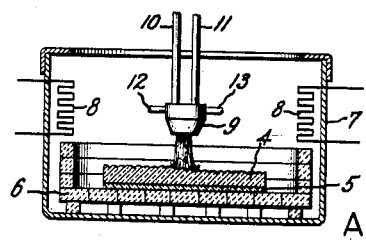

Our invention will be described in greater detail in connection with the accompanying drawing in which Fig. 1 is a vertical section of the support and a silica base in the process of being deposited thereon, the burner being symbolically indicated; Fig. 2 is a vertical section illustrating the second stage of fabrication wherein the silica base produced by spraying is trimmed to remove ridges and other imperfections; Fig. 3 shows the facing layer being deposited; Fig. 4 is a somewhat conventional vertical section of a furnace wherein the fabrication of a composite body comprising our invention is carried out.

As illustrated in Fig. 1, a layer of silica 4 is deposited upon a support 5 consisting of suitable refractory material, as, for example a mixture of about 90 to 95 parts comminuted silica and about 10 to 5 parts fire clay, the proportions not being critical. The clay binder may be omitted under some conditions. This support 5 rests on a support of fire brick 6. As shown in Fig. 4, the support 5 is heated in a furnace 7 by any suitable means, such as an electric resistance heater 8 to a temperature at which deposition of silica or the like can occur thereon, say 1000° C. Particles of silica from the burner 9 are caused to impinge upon the support 5, and after an initial layer of silica has been deposited, by impinging upon the heated silica layer with which they are incorporated by fusion. The burner is supplied with combustible and combustion-supporting gases through the conduits 10, 11 and with finely divided silica conveyed by one of the gases from a feeding device (not shown). Separate conduits 12, 13 are shown to convey cooling water to the burner. As the details of construction of the burner and other parts of the apparatus and the method of supplying finely divided silica are described in the above mentioned United States Patent 1,869,163 and the Ellis and Winckler application (and the foreign patents corresponding in disclosure thereto) the particular features of this apparatus and process will not be repeated in the present application. The rate of gas feed and the rate of supply of comminuted silica are regulated to lay down the silica in a fused state as rapidly as possible regardless of the formation of bubbles. The result will be a more or less translucent product having a mass density of about 2.0 which is lower than the density of clear fused silica. It has a non-granular structure and its appearance is characteristic of silica set from fusion.

It is found that as the deposition of silica by the spray-accretion process proceeds that irregularities and ridges 14 develop in the contour of the successive superimposed layers of silica. The oxy-hydrogen flame instead of smoothing out these irregularities on the contrary tends to accentuate them so that it is impracticable to deposit the facing layer of high grade clear transparent silica upon a base built up of many layers without further preparation.

As shown in Fig. 2 this difficulty is overcome by allowing the base to cool and then cutting away the ridges and irregularities to produce a smooth surface on the silica base. The cooling is best accomplished without disturbing the base within the enclosure or preheating furnace within which the deposition occurs. For the manufacture of an astronomical mirror 5 feet or more in diameter it is desirable that the rate of cooling should be such that about 10 days are consumed in cooling a blank about 10 inches thick down to room temperature.

After the ridges and irregularities have been trimmed off the deposition of the clear layer proceeds but at a materially slower rate of deposition in order to produce fusion without incorporation of gas bubbles so that the deposited material is clear, homogeneous and has a density of about 2.2.

The relative rate of feeding depends so much on the conditions, as for example the size and shape of the burner, the size of the grains of the silica fed to the burner, the pressure of the gas, etc., that exact figures can not be given. However, for illustrative purposes it may be said that the deposition of the base can occur under such conditions that about one cubic inch of silica is deposited by the burning of about ten cubic feet of hydrogen or other combustion-supporting gas, the deposition occurring during the period of about one hour. The rate of deposition of the clear facing layer will under similar conditions be about $\frac{1}{10}$ as fast as this, that is, to deposit about $\frac{1}{10}$ cubic inch of silica by the combustion of about 10 cubic feet of hydrogen in one hour.

As described in a copending application of Elihu Thomson, (docket No. 49,109) Serial No. 610,385, filed concurrently herewith, an advantage is gained if the transparent, dense facing layer may be formed first by the spray-accretion process, the base being deposited subsequently upon the facing layer. By proceeding in this way the steps of cooling down of the base to room temperature, cutting off the ridges, and again heating to the temperature at which deposition of the facing can take place are avoided.

What we claim as new and desire to secure by Letters Patent of the United States is:

1. An article of manufacture comprising a unitary article, one portion of which consists of transparent vitreous silica having a density of about 2.2, being substantially devoid of gas inclusions and another portion of which is translucent, having a density of about 2.0, containing gas inclusions, said article otherwise being homogeneous in structure throughout.

2. An astronomical mirror comprising a base of silica which has a density of less than 2.2, containing gas inclusions having the structureless appearance of vitreous material set from fusion, and a facing layer united therewith which is transparent, having a density of about 2.2 and also having the structureless appearance of vitreous material set from fusion.

3. The process of fabricating composite silica bodies which consists in forming one portion thereof by the accretion of fused silica particles at a rate so high that a translucent body is formed having numerous gas inclusions, and a mass density which is lower than that of clear, homogeneous fused silica, removing surface irregularities from said body and forming another portion of said body on a surface from which irregularities have been removed at a materially lower rate at which a transparent product is formed which has a density of about 2.2.

ALVARADO L. R. ELLIS.
GUNNAR A. F. WINCKLER.